(12) United States Patent
Lin (10) Patent No.: US 7,413,000 B2
(45) Date of Patent: Aug. 19, 2008

(54) SUN SCREEN DEVICE

(75) Inventor: Paul Lin, Yung-Kang (TW)

(73) Assignee: Macauto Industrial Co., Ltd., Yung-Kang (TW)

( * ) Notice: Subject to any disclaimer, the term of this patent is extended or adjusted under 35 U.S.C. 154(b) by 435 days.

(21) Appl. No.: 11/224,968

(22) Filed: Sep. 14, 2005

(65) Prior Publication Data

US 2007/0056696 A1   Mar. 15, 2007

(51) Int. Cl.
*A47G 5/02* (2006.01)
*E06B 9/56* (2006.01)

(52) U.S. Cl. ............... 160/310; 160/370.22; 160/273.1; 160/265

(58) Field of Classification Search ........... 160/238, 160/266, 268.1, 270, 271, 273, 239, 31, 371, 160/240, 66, 85, 87, 273.1, 370.22, 311; 248/252, 200, 251; 296/97.7, 97.8, 98
See application file for complete search history.

(56) References Cited

U.S. PATENT DOCUMENTS

| | | | |
|---|---|---|---|
| 6,216,762 B1 * | 4/2001 | Lin | 160/370.22 |
| 6,676,205 B2 * | 1/2004 | Lin | 296/214 |
| 6,691,965 B1 * | 2/2004 | Lin | 248/274.1 |
| 7,188,659 B2 * | 3/2007 | Hansen et al. | 160/370.22 |
| 2003/0205267 A1 * | 11/2003 | Lin | 135/88.12 |

* cited by examiner

*Primary Examiner*—George B. Nguyen
*Assistant Examiner*—Samuel S Lin
(74) *Attorney, Agent, or Firm*—Lowe Hauptman Ham & Berner LLP (57) ABSTRACT

A sun screen device includes a pair of slide rails, a screen body, and a pair of rods. Each of the slide rails has an end portion. The screen body has lateral ends, and an operating end that interconnects the lateral ends of the screen body and that is movable along the slide rails. The rods are respectively disposed in the slide rails. Each of the rods has an end portion that is coupled to the end portion of the respective one of the slide rails. Each of the lateral ends of the screen body is formed with a loop that is sleeved on a respective one of the rods.

7 Claims, 8 Drawing Sheets

SUN SCREEN DEVICE

BACKGROUND OF THE INVENTION

1. Field of the Invention

This invention relates to a sun screen device that is operable so as to cover and uncover a sunroof of an automobile.

2. Description of the Related Art

Figure 1:
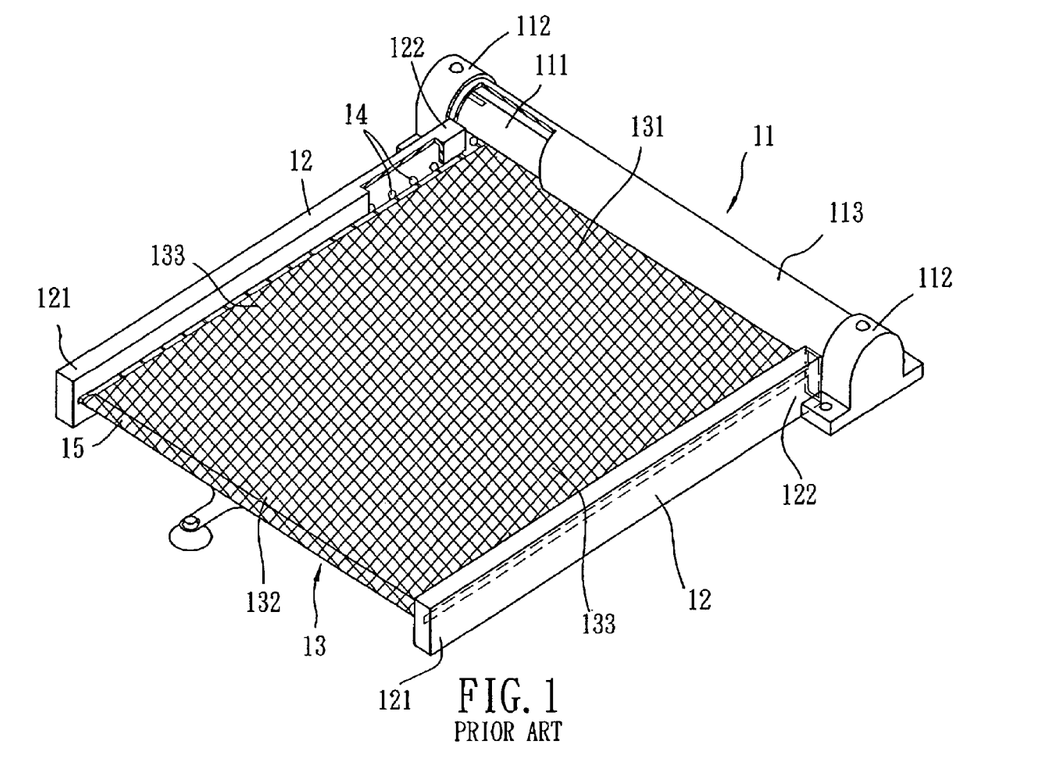
FIG. 1 is a perspective view of a conventional sun screen device.

FIG. 1 illustrates a conventional sun screen device that includes a pair of elongate first and second slide rails 12, a shaft unit 11, a screen unit, and a guide unit.

The sun screen device is adapted to be mounted beneath a sunroof (not shown) of an automobile (not shown), and is operable so as to cover and uncover the latter.

Figure 2:
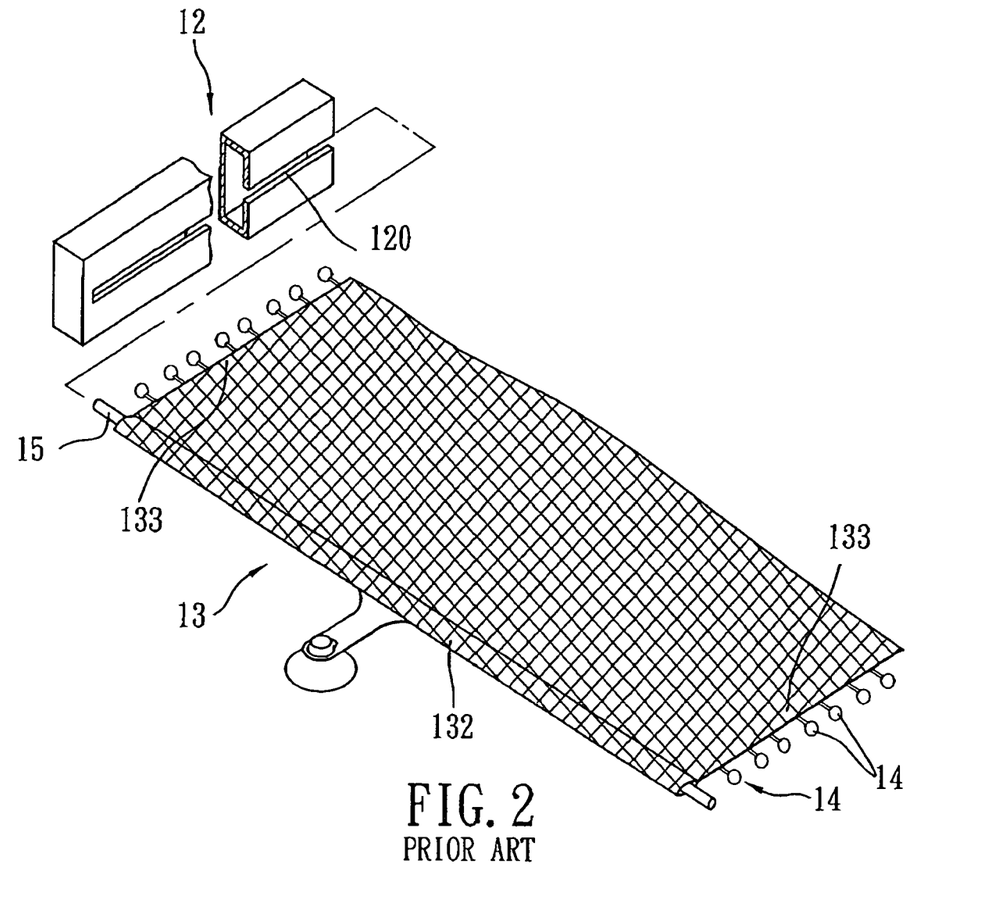
FIG. 2 is a fragmentary perspective view of the conventional sun screen device to illustrate a guide unit of the same.

Each of the first and second slide rails 12 extends in a first direction, has first and second end portions 121, 122 that are opposite to each other in the first direction, and defines a rail groove 120 therein (see FIG. 2). The first and second slide rails 12 are spaced apart from each other in a second direction transverse to the first direction.

The shaft unit 11 is disposed proximate to the second end portions 122 of the first and second slide rails 12, and includes a pair of seat members 112, a shaft member 111, and a shaft cover 113. The seat members 112 are spaced apart from each other in the second direction. The shaft member 111 extends in the second direction, and has opposite end portions, each of which is coupled rotatably to a respective one of the seat members 112. The shaft cover 113 partially covers the shaft member 111.

The screen unit includes a flexible screen body 13 and an operating member 15. The screen body 13 has a securing end 131 that is secured to the shaft member 111 of the shaft unit 11, an operating end 132 that is opposite to the securing end 131 in the first direction and that is movable in the first direction, and first and second lateral ends 133 that are opposite to each other in the second direction. The operating member 15 is coupled to the operating end 132 of the screen body 13, and is operable so as to move the operating end 132 of the screen body 13 in the first direction.

The guide unit includes a plurality of ball-shaped sliding members 14. Some of the sliding members 14 are provided along the first lateral end 133 of the screen body 13 and are disposed in the rail groove 120 in the first slide rail 12. The remainder of the sliding members 14 are provided along the second lateral end 133 of the screen body 13 and are disposed in the rail groove 120 in the second slide rail 12.

In operation, when an external force is applied to the operating member 15 such that the operating end 132 of the screen body 13 moves away from the shaft unit 11, the shaft member 111 rotates in a first angular direction. This results in unwinding of the screen body 13 from the shaft member 111 and sliding movement of the sliding members 14 along the first and second slide rails 12, thereby covering the sunroof. On the other hand, when an external force is applied to the operating member 15 such that the operating end 132 of the screen body 13 moves toward the shaft unit 11, the shaft member 111 rotates in a second angular direction opposite to the first angular direction. This results in winding of the screen body 13 on the shaft member 111 and sliding movement of the sliding members 14 along the first and second slide rails 12, thereby uncovering the sunroof.

Although the conventional sun screen device achieves its intended purpose, when the screen body 13 is wound on the shaft member 111, the sliding members 14 overlap each other, resulting in bulging at both end portions of the shaft member 111. As such, a relatively large shaft cover 113 is required in order to conceal the shaft member 111.

SUMMARY OF THE INVENTION

Therefore, the object of the present invention is to provide a sun screen device that can overcome the aforesaid drawback of the prior art.

According to the present invention, a sun screen device comprises a pair of elongate slide rails, a flexible screen body, and a guide unit. Each of the slide rails extends in a first direction, and has first and second end portions that are opposite to each other in the first direction. The slide rails are spaced apart from each other in a second direction transverse to the first direction. The screen body has lateral ends that are opposite to each other in the second direction, and an operating end that interconnects the lateral ends of the screen body and that is movable in the first direction. The guide unit serves to guide movement of the operating end of the screen body in the first direction, and includes a pair of crooked rods that are respectively disposed in the slide rails. Each of the rods has a first end portion that is coupled to the first end portion of the respective one of the slide rails, a second end portion that is opposite to the first end portion of the respective one of the rods in the first direction, and contact portions that are disposed between the first end portion and the second end portion of the respective one of the rods and that urge against the respective one of the slide rails. Each of the lateral ends of the screen body is formed with a loop that is sleeved on a respective one of the rods.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail, it should be noted that like elements are denoted by the same reference numerals throughout the disclosure.

Figure 3:
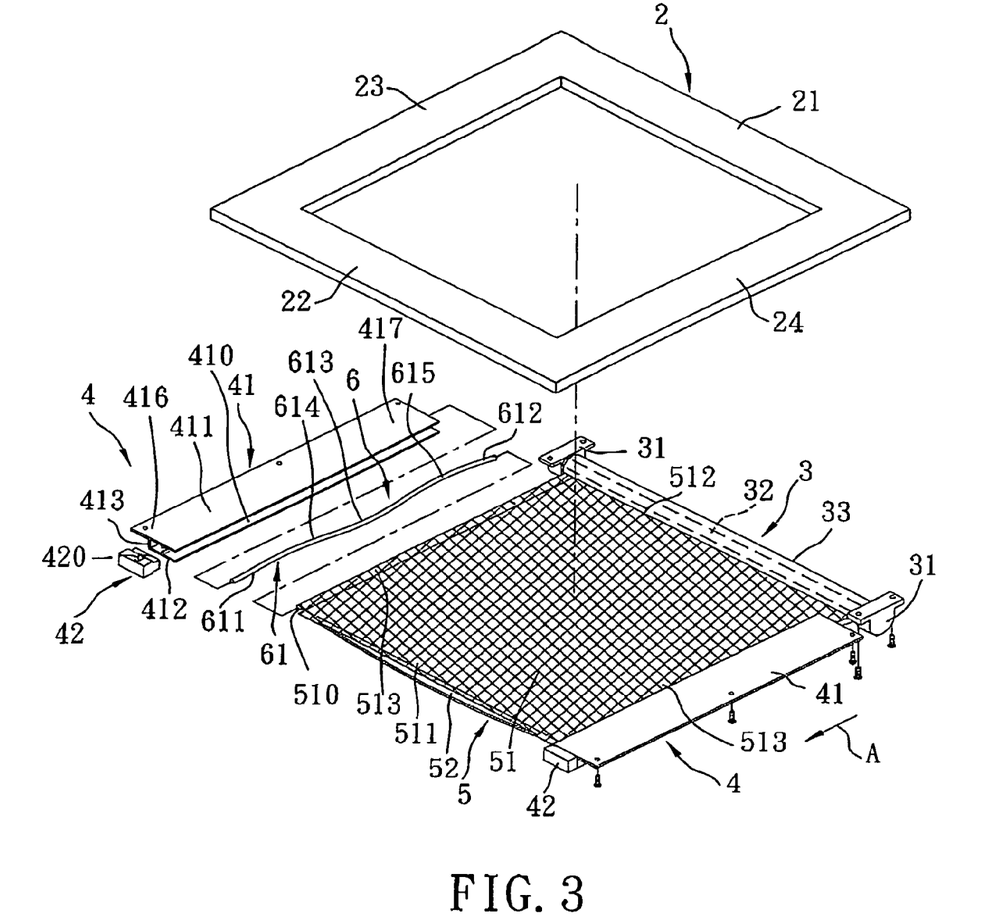
FIG. 3 is an exploded perspective view of the first preferred embodiment of a sun screen device according to the present invention.

Referring to FIG. 3, the first preferred embodiment of a sun screen device according to this invention is shown to include a rail unit 4, a shaft unit 3, a screen unit 5, and a guide unit 6.

The sun screen device is adapted to cover and uncover a sun roof of an automobile (not shown). In this embodiment, the sunroof includes a rectangular frame 2 on which the sun screen device is to be mounted. The rectangular frame 2 of the sunroof includes first and second frame parts 21, 22, which are opposite to each other in a first direction, and third and fourth frame parts 23, 24, which are opposite to each other in a second direction transverse to the first direction.

The rail unit 4 includes a pair of elongated slide rails 41 that are spaced apart from each other in the second direction, and that are respectively mounted on the third and fourth frame parts 23, 24 of the frame 2 of the sunroof. Since the slide rails 41 are identical in construction, only one of the slide rails 41 will be described herein.

Figure 4:
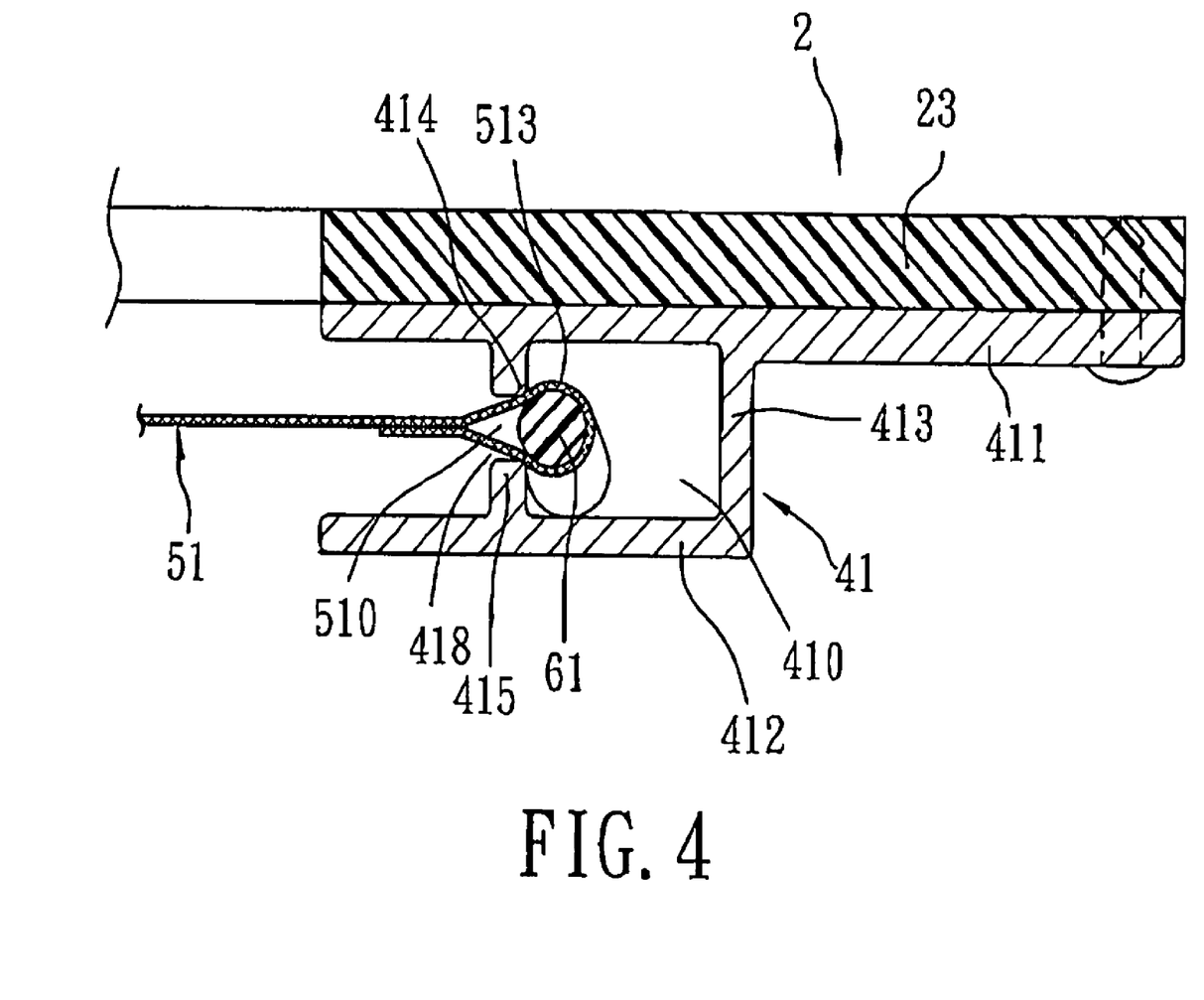
FIG. 4 is a fragmentary schematic sectional view to illustrate how a screen body is connected to a guide unit of the first preferred embodiment.

The slide rail 41 extends in the first direction, and has first and second end portions 416, 417 that are opposite to each other in the first direction. A securing member 42 is mounted on the first end portion 416 of the slide rail 41 and is formed with a groove 420. The slide rail 41 includes parallel first and second rail parts 411, 412, and a third rail part 413 that interconnects the first and second rails parts 411, 412. The first, second, and third rail parts 411, 412, 413 of the slide rail 41 cooperate to define a rail groove 410 thereamong. With further reference to FIG. 4, the slide rail 41 further includes a fourth rail part 414 that extends from the first rail part 411 toward the second rail part 412 of the slide rail 41, and a fifth rail part 415 that extends from the second rail part 412 toward the first rail part 411 of the slide rail 41. The fourth and fifth rail parts 414, 415 of the slide rail 41 oppose each other and define a gap 418 therebetween. The gap 418 between the fourth and fifth rails parts 414, 415 of the slide rail 41 is in spatial communication with the rail groove 410 in the slide rail 41.

The shaft unit 3 is disposed proximate to the second end portions 417 of the slide rails 41, and is mounted on the first frame part 21 of the frame 2 of the sunroof. In this embodiment, the shaft unit 3 includes a pair of seat members 31, a shaft member 32, and a shaft cover 33. The seat members 31 are spaced apart from each other in the second direction. The shaft member 32 extends in the second direction, and has opposite end portions, each of which is coupled rotatably to a respective one of the seat members 31. The shaft cover 33 partially covers the shaft member 32.

The screen unit 5 includes a flexible screen body 51 and an operating member 52. The screen body 51 has a securing end 512 that is secured to the shaft member 32 of the shaft unit 3, an operating end 511 that is opposite to the securing end 512 of the screen body 51 in the first direction and that is movable in the first direction, and lateral ends 513 that are opposite to each other in the second direction. The operating member 52 is coupled to the operating end 511 of the screen body 51, extends in the second direction, and is operable so as to move the operating end 511 in the first direction.

Figure 5:
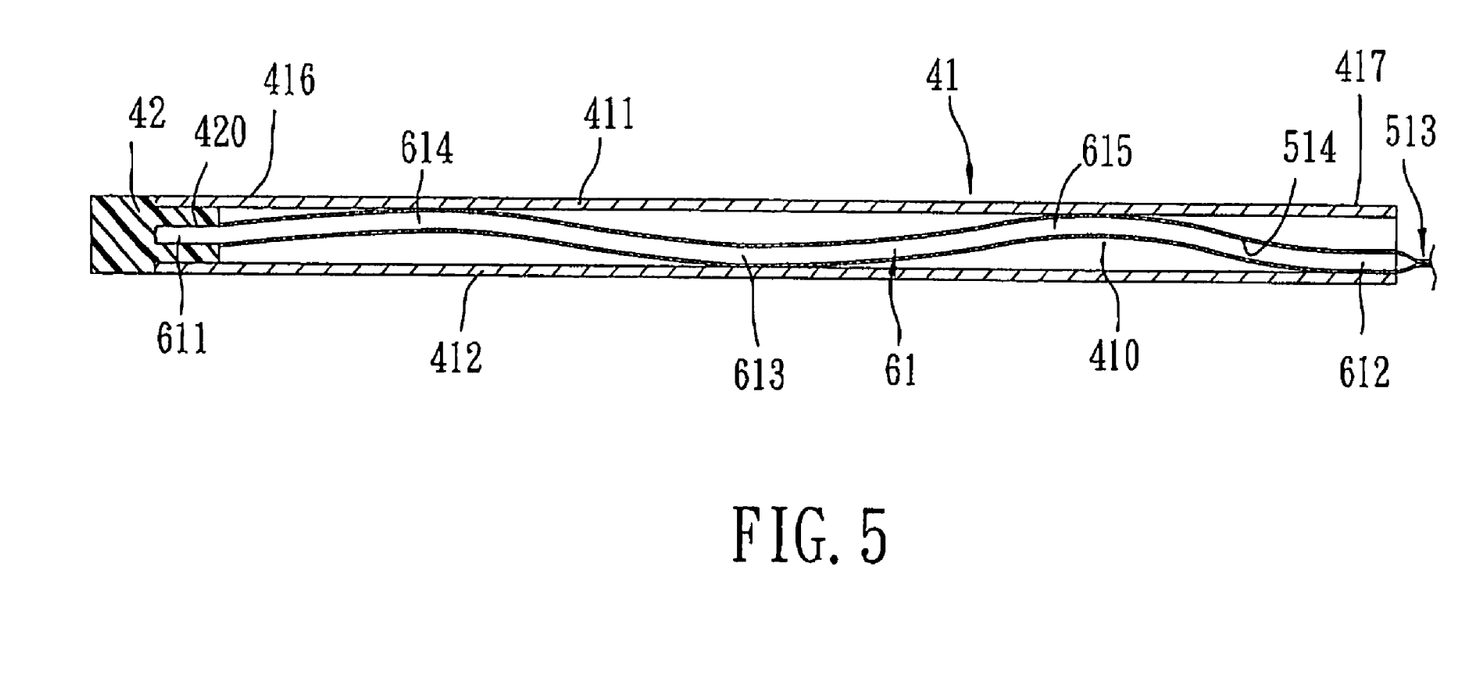
FIG. 5 is a fragmentary schematic sectional view to illustrate a rod of the guide unit of the first preferred embodiment.

With further reference to FIG. 5, the guide unit 6 serves to guide movement of the operating end 511 of the screen body 51 in the first direction, and includes a pair of crooked rods 61, each of which is disposed in the rail groove 410 in a respective one of the slide rails 41. Each of the lateral ends 513 of the screen body 51 is formed with a loop 510, as best shown in FIG. 4, that is sleeved on a respective one of the rods 61. Since the rods 61 are identical in construction and operation, only one of the rods 61 will be described herein. The rod 61 has a first end portion 611 that is received snugly in the groove 420 in the securing member 42, a second end portion 612 that is opposite to the first end portion 611 of the rod 61 in the first direction, and contact portions 613, 614, 615 that are disposed between the first end portion 611 and the second end portion 612 of the rod 61. By virtue of the shape of the rod 61, two adjacent ones of the contact portions 613 respectively urge against the first and second rail parts 411, 412 of the rod 41. Accordingly, undesirable noise can be prevented when the rod 61 repeatedly hits the slide rail 41 as a result of vibration of the automobile.

In operation, referring to FIGS. 3 and 5, when an external force is applied to the operating member 52 such that the operating end 511 of the screen body 51 moves away from the shaft unit 3, as indicated by arrow (A), the shaft member 32 rotates in a first angular direction. This results in unwinding of the screen body 51 from the shaft member 32 and sliding movement of the lateral ends 513 of the screen body 51 along the rods 61, thereby covering the sunroof. On the other hand, referring to FIGS. 6 and 7, when an external force is applied to the operating member 52 such that the operating end 511 of the screen body 51 moves toward the shaft unit 3, as indicated by arrow (B), the shaft member 32 rotates in a second angular direction opposite to the first angular direction. This results in winding of the screen body 51 on the shaft member 32 and sliding movement of the lateral ends 513 of the screen body 51 along the rods 61, thereby uncovering the sunroof.

Figure 6:
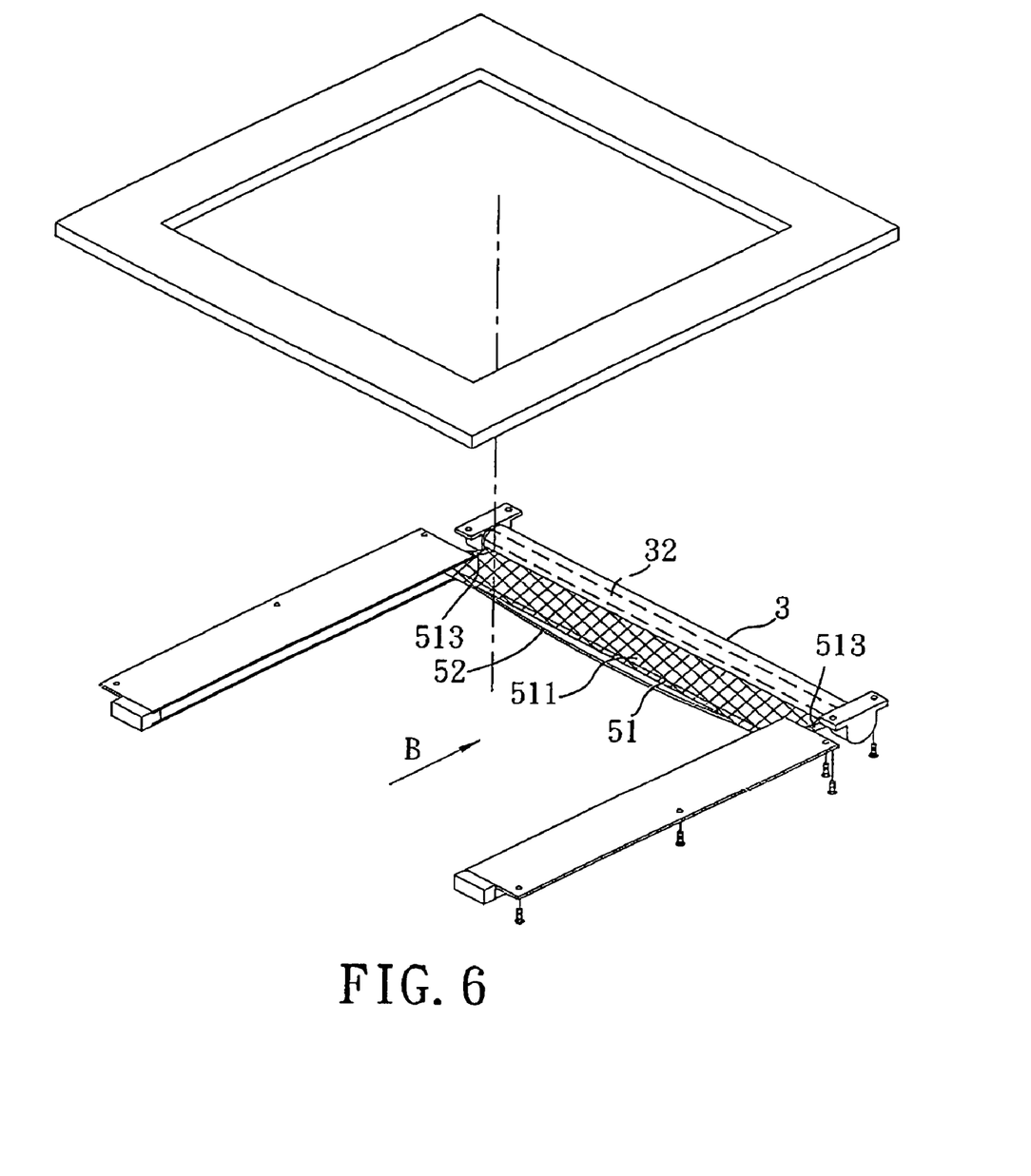
FIG. 6 is a partly exploded perspective view to illustrate the first preferred embodiment in a retracted state.
Figure 7:
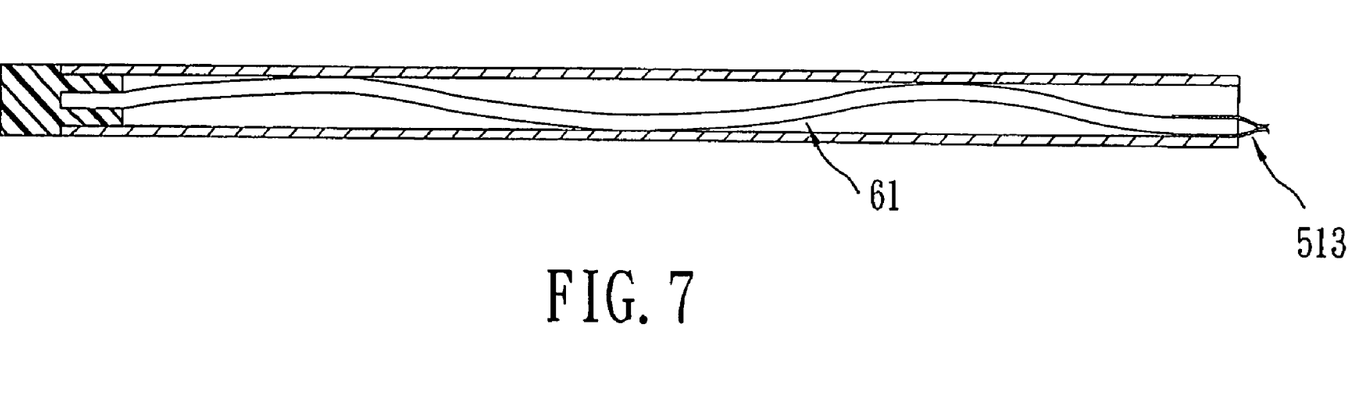
FIG. 7 is a fragmentary schematic sectional view of the first preferred embodiment to illustrate the position of the screen body relative to the rod of the guide unit.

Since the rods 61 are not wound on the shaft member 32 during winding of the screen body 51 on the shaft member 32, the size of the shaft cover 33 can be minimized.

Figure 8:
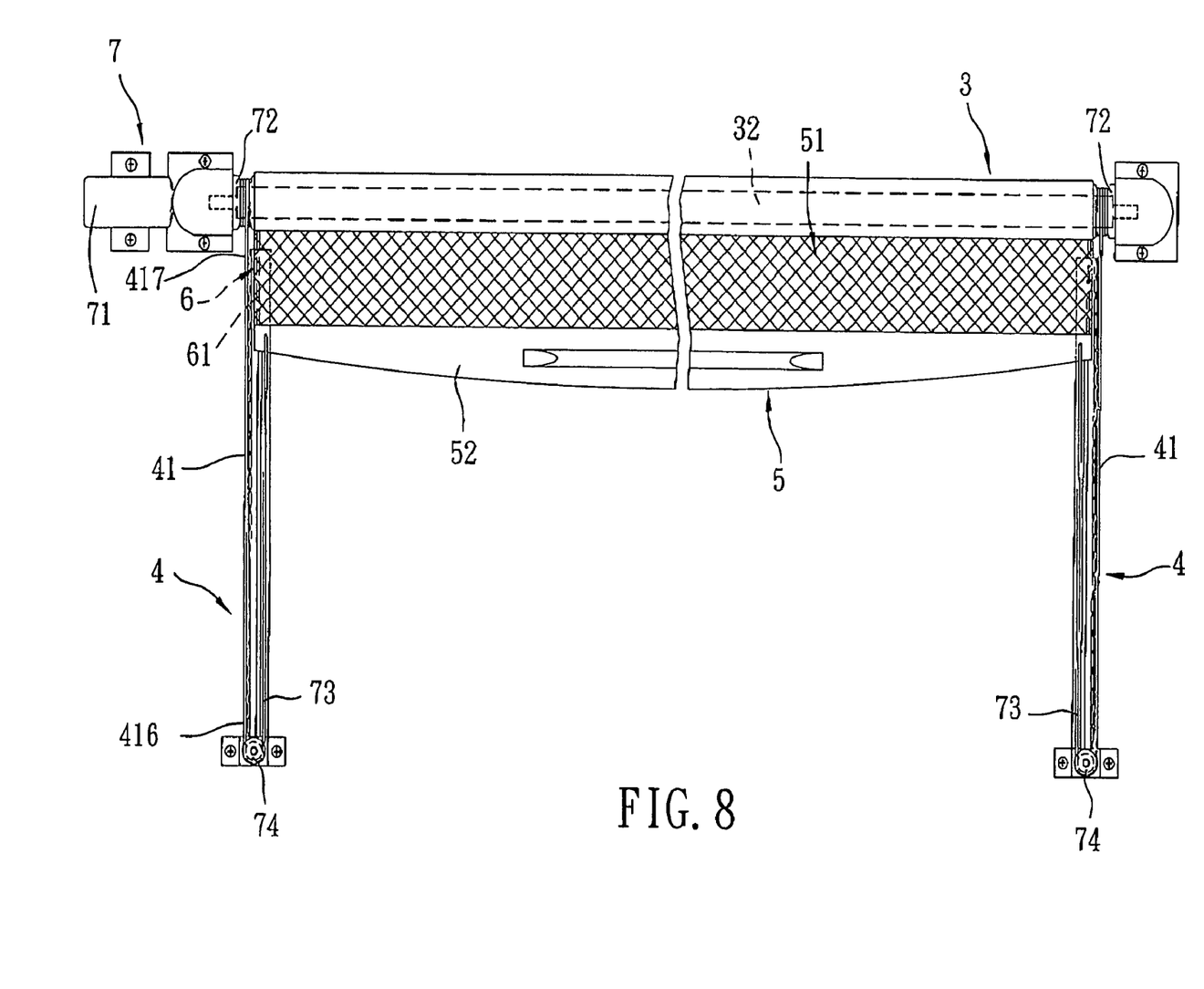
FIG. 8 is a schematic view of the second preferred embodiment of a sun screen device according to the present invention.

FIG. 8 illustrates the second preferred embodiment of a sun screen device according to this invention. When compared with the previous embodiment, the sun screen device further includes an automation mechanism 7 that is operable so as to automatically move the operating member 52 in the first direction. In this embodiment, the automation mechanism 7 includes a motor 71, a pair of cord spools 72, a pair of pulleys 74, and a pair of pull cords 73.

The motor 71 is coupled to the shaft member 32 of the shaft unit 3, and is operable so as to rotate the shaft member 32 in the first and second angular directions.

Each of the cord spools 72 is coupled coaxially on and co-rotatably to a respective one of the end portions of the shaft member 32 of the shaft unit 3.

Each of the pulleys 74 is mounted rotatably on the first end portion 416 of the respective one of the slide rails 41 of the rail unit 4.

Each of the pull cords 73 is wound on a respective one of the cord spools 72, is trained on a respective one of the pulleys 73, and is coupled to the operating member 52 of the screen unit 5.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A sun screen device, comprising:
   a pair of elongate slide rails, each of which extends in a first direction and has first and second end portions that are opposite to each other in the first direction, said slide rails being spaced apart from each other in a second direction transverse to the first direction;
   a flexible screen body having lateral ends that are opposite to each other in the second direction, and an operating end that interconnects said lateral ends of said screen body and that is movable in the first direction; and
   a guide unit for guiding movement of said operating end of said screen body in the first direction, and including a pair of crooked rods that are respectively disposed in said slide rails, each of said rods having a first end portion that is coupled to said first end portion of a respective one of said slide rails, a second end portion that is opposite to said first end portion of the respective one of said rods in the first direction, and contact portions that are disposed between said first end portion and said second end portion of the respective one of said rods and that urge against the respective one of said slide rails;

wherein each of said lateral ends of said screen body is formed with a loop that is sleeved on a respective one of said rods.

2. The sun screen device as claimed in claim 1, further comprising a pair of securing members, each of which is mounted on said first end portion of a respective one of said slide rails and each of which is formed with a groove, said first end portion of each of said rods being snugly received in said groove in a respective one of said securing members.

3. The sun screen device as claimed in claim 1, further comprising an automation mechanism that is operable so as to automatically move said operating end of said screen body in the first direction.

4. The sun screen device as claimed in claim 1, further comprising a shaft unit disposed proximate to said second end portions of said slide rails, said shaft unit including
 a pair of seat members that are spaced apart from each other in the second direction, and
 a shaft member that has opposite end portions, each of which is coupled rotatably to a respective one of said seat members.

5. The sun screen device as claimed in claim 4, wherein said shaft unit further includes a shaft cover that partially covers said shaft member.

6. The sun screen device as claimed in claim 4, further comprising an automation mechanism that is operable so as to automatically move said operating end of said screen body in the first direction.

7. The sun screen device as claimed in claim 6, wherein said automation mechanism includes
 a motor that is coupled to said shaft member of said shaft unit, and that is operable so as to rotate said shaft member in first and second angular directions,
 a cord spool that is coupled coaxially and co-rotatably to said shaft member of said shaft unit,
 a pulley mounted rotatably on one of said slide rails of said rail unit, and
 a pull cord that is wound on said cord spool, that is trained on said pulley, and that is coupled to said operating end of said screen unit.

* * * * *